United States Patent [19]
Knapp

[11] 4,043,148
[45] Aug. 23, 1977

[54] UNIVERSAL DRIVE JOINT

[76] Inventor: Philip B. Knapp, 40 Reyam Road, Lynbrook, N.Y. 11563

[21] Appl. No.: 664,195

[22] Filed: Mar. 5, 1976

[51] Int. Cl.² ............................................. F16D 3/26
[52] U.S. Cl. .................................... 64/17 R; 64/12; 64/15 B; 64/19
[58] Field of Search ................ 64/17, 19, 6, 20, 15 R, 64/15 B

[56] References Cited

U.S. PATENT DOCUMENTS

| | | | |
|---|---|---|---|
| 1,602,912 | 10/1926 | Leipert | 64/12 |
| 2,617,277 | 11/1952 | Sindelar | 64/17 |
| 2,861,437 | 11/1958 | Bachman | 64/15 B |
| 2,950,133 | 8/1960 | Johnson et al. | 287/1 |
| 2,950,609 | 8/1960 | Goodloe | 64/15 R |

FOREIGN PATENT DOCUMENTS

| | | | |
|---|---|---|---|
| 533,395 | 8/1931 | Germany | 64/12 |

*Primary Examiner*—Samuel Scott
*Assistant Examiner*—Randall Heald
*Attorney, Agent, or Firm*—Theodore J. Long; John M. Winter; Harry C. Engstrom

[57] ABSTRACT

A universal joint having two intermeshed rotatable assemblies in driving and driven relationship. Each of the assemblies of the joint has a base adapted to be connected to a rotatable device. Each assembly has a plurality of yoke arms fixed at one end to the base and at the other end to a joinder disc through which the axis of rotation of the base passes. Each of the yoke arms extends in a plane including the axis of rotation of the base and curves outwardly from its common point of joinder and then inwardly toward the axis of rotation of the base. Each yoke arm has an eliptical cross-section at its end attached to the base and gradually tapers to a circular cross-section toward its other end at its common point of attachment to the other yoke arms.

4 Claims, 3 Drawing Figures

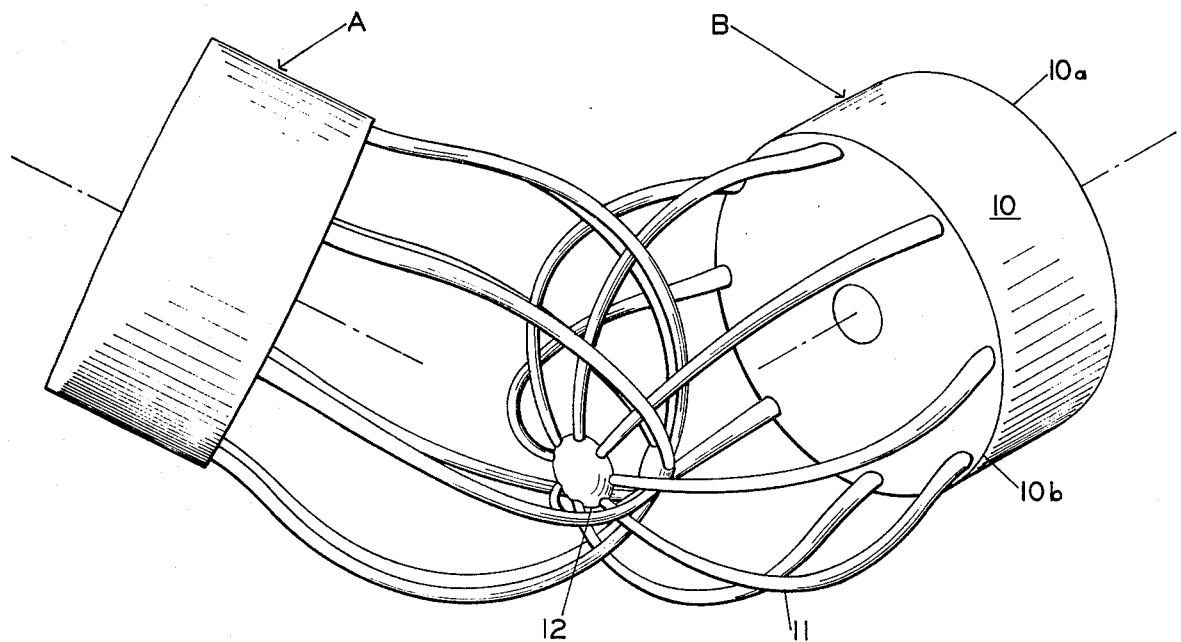
FIG. 1
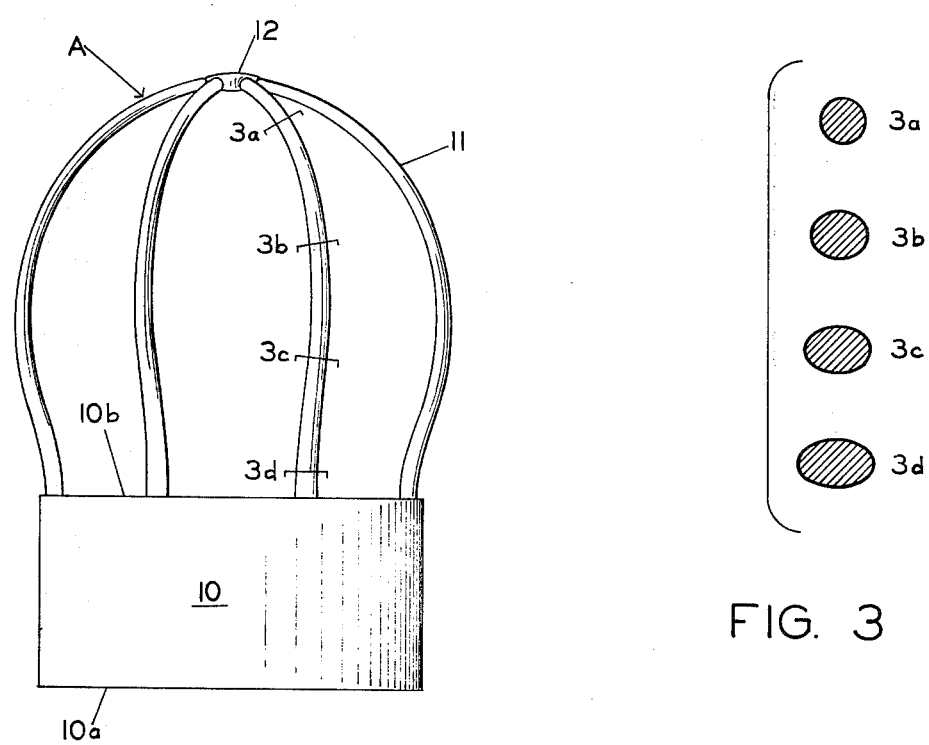
FIG. 2
FIG. 3

UNIVERSAL DRIVE JOINT

BACKGROUND OF THE INVENTION

1. Field of the Invention

This invention relates to a universal drive joint capable of transmitting rotative force from a drive shaft to a non-aligned driven shaft which may be angularly pivoted with respect to the drive shaft during rotation.

2. Description of the Prior Art

Universal drive joint is the broadly descriptive name given to devices which transfer power in the form of torque from one shaft to another. Such joints are, of course, of greatest utility when the respective driving and driven shafts are not co-linear and the angular relationship of the shafts can be varied during rotation.

While universal drive joints generally have been known and used for some time, they have not been particularly successful because of rather limited angular restriction, poor torque transmission capabilities, wearing of intermeshing parts, and related problems.

SUMMARY OF THE INVENTION

My invention involves a universal drive joint having direct interaction between intermeshed yoke assemblies. In its general configuration shown herein for exemplification, the universal drive joint has two coupling assemblies, each of which has a cylindrical base and three yokes. All three yokes are fitted into the base in a symmetrical arrangement and join at a common point on the axis of rotation of the coupling assembly.

In the preferred form, the individual yoke arms are arranged in opposed pairs forming a yoke having an arcuate figuration. In profile, a typical assembly generally resembles the shape of a common light bulb; the arcuate yokes corresponding to the glass portion of the bulb. Each yoke arm has an eliptical cross-section at the end attached to the base and gradually tapers to a circular cross-section toward its other end.

The multiple yokes of an assembly form a cage-like structure. Engagement between the two cages is effected by intermeshing them (much like inserting the fingers of one hand between those of another) before the respective bases are attached. When the two assemblies are intermeshed, the point of common joinder of the yoke arms of one assembly is intermediate the point of joinder and base of the other assembly.

My universal drive joint can be operated with the axes of rotation of the two intermeshed assemblies being at an angle of more than 90°. Tests have been conducted with the angular displacement up to about 120°. The unique construction of this joint provides strength for efficient torque transmission even at large angular displacement of the driving and driven shafts.

Further objects, features and advantages of my invention will be apparent from the following detailed description taken in conjunction with the accompanying drawings showing a preferred embodiment of a universal drive joint exemplifying the principles of my invention.

BRIEF DESCRIPTION OF THE DRAWINGS

FIG. 1 is an isometric view of two intermeshed assemblies of the universal drive joint.

FIG. 2 is a side view of one assembly of the universal joint shown in FIG. 1.

FIG. 3 is a series of enlarged sections taken along section lines 3a-3d in FIG. 2 showing the cross-sectional configuration at various positions along a yoke arm.

DETAILED DESCRIPTION OF A PREFERRED EMBODIMENT

As shown in the drawings wherein like numerals refer to like parts throughout the several views, the universal drive joint comprises two intermeshed coupling assemblies, depicted generally at A and B in FIG. 1. Each assembly has a cylindrical base 10 having an axis of rotation, an attachment end 10a, and an adjacent end 10b. The attachment end of each base is adapted to be connected by any suitable means to a rotatable device (not shown).

A plurality of yoke arms 11, eight in the embodiment shown for exemplification, are rigidly affixed at one end in the adjacent end 10a of the base 10 in equally spaced relationship to each other and to the axis of rotation of the base. The yoke arms are attached at their outer end by a means of common joinder in the form of a disc 12. The axis of rotation of the base passes through the center of the joinder disc. The eight yoke arms are radially disposed 45° about the axis of rotation of the base whereby each arm is disposed 180° from another arm to provide a cage-like structure comprising three equally spaced yokes.

Each of the yoke arms lies in a plane which includes the axis of rotation of the base to which it is fixedly attached. Each arm curves outwardly from the joinder disc and then curves inwardly toward the axis of rotation of the base. As best seen in FIG. 2, the arcuate yoke arms are formed in a reverse curve configuration so that they meet the adjacent end of the base to which they are attached substantially parallel to the axis of rotation of the base. It is this bulbous configuration of the cage-like yoke construction that allows the joint to operate at an angular displacement of the axes of rotation of the assemblies of 90° and greater.

As shown in FIG. 1, the yokes on the respective assemblies A and B are intermeshed with each other somewhat as the fingers of one hand might be inserted between the fingers of the other hand. Engagement of the two yoke cages is effected by intermeshing them before their respective bases are attached. When intermeshed, the joinder disc of one assembly is disposed intermediate the joinder disc and base of the other assembly.

In order to provide proper driving engagement of the yokes of one assembly with the yokes of the second assembly over the widest range of angular displacement of the axes of rotation of the assemblies, as shown in the drawings and best depicted in FIG. 3 each yoke arm is circular in cross-section at its end adjacent the joinder disc and eliptical in cross-section at its end adjacent the base. The major axis of the cross-sectional elipse is perpendicular to a radius from the axis of rotation of the base to the center of the elipse. The dimension of the major axis gradually decreases along the yoke arm until the cross-section of the arm becomes circular.

This particular configuration along with the means of common joinder of the yoke arms at the axis of rotation of the assembly maximizes the strength and torque transmission capabilities of the universal drive joint over a much wider angular disposition of the axes of rotation than has heretofore been possible to achieve in the construction of universal drive joints.

It is understoood that my invention is not limited to the particular construction and arrangement of parts herein illustrated and described for exemplification, but embraces all such modified forms thereof as come within the scope of the following claims.

I claim:

1. A universal joint comprising two intermeshed rotatable assemblies in driving and driven relationship with each other, each of said assemblies comprising:
   a. a base having an axis of rotation, an attachment end, and an adjacent end, wherein said attachment end is adapted to be connected to a rotatable device; and
   b. a plurality of yoke arms fixed at one end in said adjacent end of said base in spaced relationship to each other and said axis of rotation, said yoke arms being fixedly attached at their other end by a means of common joinder through the center of which the axis of rotation of said base passes, each of said yoke arms extending in a plane including the axis of rotation of said base and curving outwardly from said means of common joinder and thence inwardly toward said axis of rotation, said means of common joinder of each assembly being spaced from the means of common joinder of the other assembly and being intermediate the means common of joinder and the base of said other assembly to provide a bulbous cage-like structure loosely intermeshed with said other assembly.

2. The universal joint as specified in claim 1 wherein each of said yoke arms is circular in cross-section at its end adjacent said means of common joinder and eliptical in cross-section at its end adjacent said base, the major axis of said elipse being perpendicular to a radius from said axis of rotation of said base to the center of said elipse, the dimension of said major axis gradually decreasing along said arm until the cross-section of said arm is circular.

3. The universal joint as specified in claim 1 wherein said yoke arms have a reverse curve configuration.

4. The universal joint as specified in claim 3 wherein each of said yoke arms is circular in cross-section at its end adjacent said means of common joinder and eliptical in cross-section at its end adjacent said base, the major axis of said elipse being perpendicular to a radius from said axis of rotation of said base to the center of said elipse, the dimension of said major axis gradually decreasing along said arm until the cross-section of said arm is circular.

* * * * *